United States Patent Office 2,705,707
Patented Apr. 5, 1955

2,705,707

COPPER-CONTAINING TRISAZO DYESTUFFS

Ernst Iselin, Dornach, Switzerland, assignor to Sandoz A. G., Basel, Switzerland No Drawing. Application August 11, 1952, Serial No. 303,821

Claims priority, application Switzerland August 31, 1951

6 Claims. (Cl. 260—145)

The present invention relates to copper-containing trisazo dyestuffs. More specifically, the present invention is concerned with the embodiment of valuable copper complex compounds of trisazo dyestuffs of the formula

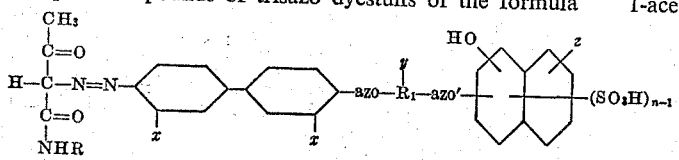

(I)

wherein R stands for an aryl radical which may be a substituted aryl radical, $R_1$ stands for an aryl radical which may be substituted by a sulfonic acid group or by other substituents, one $x$ stands for a sulfonic acid group, the other $x$ stands for hydrogen, $y$ is in ortho-position to the -azo'-group and stands for a group capable of metal complex formation, $z$ stands for hydrogen, $NH_2$, alkylated $NH_2$, arylated $NH_2$ or acylated $NH_2$, and $n$ stands for one of the integers, 1, 2, and 3, and wherein the —OH group is in ortho-position and -azo- is in para-position to the -azo'-group.

The aforesaid compounds (I) can be prepared by coupling the tetrazo compound from 1 mol of 4,4'-diamino-1,1'-diphenyl-3-sulfonic acid, on the one hand with 1 mol of an aromatic amide of acetoacetic acid, and on the other hand with 1 mol of an aromatic amine which may be sulfonated, which couples in para-position to the amino group, and which has in ortho-position to the amino group a group which is capable of metal complex formation, then further diazotizing the thus-obtained aminodisazo-dyestuff, then coupling the resultant product with 1 mol of a hydroxynaphthalene sulfonic acid of the formula

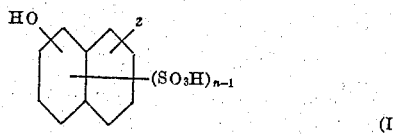

(II)

wherein $z$ and $n$ have the precedingly-indicated significances, and finally subjecting the thus-prepared trisazo dyestuff to the action of copper-yielding means.

The aforesaid compounds (I) can also be prepared by diazotizing 1 mol of 4,4'-diamino-1,1'-diphenyl-3-sulfonic acid, or the monoacylated derivative thereof, with 1 mol of an aromatic amide of acetoacetic acid, then saponifying the acylamino group of the 4-amino-4'-acylamino-1,1'-diphenyl-3-sulfonic acid moiety (in the case of the aforesaid monoacylated derivative), then further diazotizing the obtained aminoazo compound, then coupling the resultant product with 1 mol of an aromatic amine which may be sulfonated, which couples in para-position to the amino group, and which contains in ortho-position to the amino group a group which is capable of metal complex formation, then further diazotizing the thus-obtained amino-disazo dyestuff, then coupling the diazotized product with 1 mol of a hydroxynaphthalene derivative of the Formula (II), and finally subjecting the thus-prepared trisazo dyestuff to the action of copper-yielding means.

A further alternative involves diazotizing 1 mol of a monoacylated 4,4'-diamino-1,1'-diphenyl-3-sulfonic acid, then coupling the diazotized product with 1 mol of an aromatic amine which may be sulfonated, which couples in para-position to the amino group, and which contains in ortho-position to the amino group a group which is capable of metal complex formation, then further diazotizing the resultant aminoazo compound, then coupling the diazotized product with 1 mol of a hydroxyphthalene derivative of Formula II, then saponifying the acylamino group of the thus-obtained disazo dyestuff, then diazotizing the resultant amino-disazo dyestuff, then coupling the diazotized product with 1 mol of an aromatic amide of acetoacetic acid, and finally subjecting the obtained trisazo dyestuff with copper-yielding means.

Illustrative of the aromatic amides of acetoacetic acid which may be used in preparing the dyestuffs of the present invention are inter alia:

Acetoacetylaminobenzene,
1-acetoacetylamino-2-methylbenzene,
1-acetoacetylamino-3-methylbenzene,
1-acetoacetylamino-4-methylbenzene,
1-acetoacetylamino-2-methoxybenzene,
1-acetoacetylamino-3-methoxybenzene,
1-acetoacetylamino-4-methoxybenzene,
1-acetoacetylaminobenzene-3-sulfonic acid,
1-acetoacetylaminobenzene-4-sulfonic acid,
1-acetoacetylamino-2-methoxybenzene-3-sulfonic acid,
1-acetoacetylamino-2-methoxybenzene-4-sulfonic acid,
1-acetoacetylaminobenzene-4-carboxylic acid,
1-acetoacetylamino-3-hydroxybenzene-4-carboxylic acid,
1-acetoacetylamino-4-hydroxybenzene-3-carboxylic acid,
2-acetoacetylamino-naphthalene-3,6-disulfonic acid,
2-acetoacetylamino-naphthalene-4,8-disulfonic acid,
2-acetoacetylamino-naphthalene-5,7-disulfonic acid,
2-acetoacetylamino-naphthalene-6,8-disulfonic acid, etc.

Illustrative of the aromatic amines which may be sulfonated, which couple in para-position to the amino group and which contain in ortho-position to the amino group a group which is capable of metal complex formation are interalia the following:

1-amino-2-methoxybenzene,
1-amino-2-methoxy-5-methylbenzene,
1-amino-2,5-dimethoxybenzene,
1-amino-2-methoxynaphthalene,
1-amino-2-methoxynaphthalene-6-sulfonic acid,
1-amino-2-ethoxynaphthalene-6-sulfonic acid, etc.

Where monoacylated 4,4'-diamino-1,1'-diphenyl-3-sulfonic acid is not used, amines of the type of 1-amino-2-methoxy-5-acetylaminobenzene may also be used.

Illustrative of the hydroxynaphthalene derivatives of Formula II which may be used for the final or intermediate coupling step when preparing the dyestuffs of the present invention are, among many other possible coupling components:

1-hydroxynaphthalene,
2-hydroxynaphthalene,
1-hydroxynaphthalene-3-sulfonic acid,
1-hydroxynaphthalene-4-sulfonic acid,
1-hydroxynaphthalene-5-sulfonic acid,
1-hydroxynaphthalene-3,6-disulfonic acid,
1-hydroxynaphthalene-3,8-disulfonic acid,
2-hydroxynaphthalene-4-sulfonic acid,
2-hydroxynaphthalene-6-sulfonic acid,
2-hydroxynaphthalene-7-sulfonic acid,
2-hydroxynaphthalene-3,6-disulfonic acid,
2-amino-5-hydroxynaphthalene-7-sulfonic acid,
2-methylamino-5-hydroxynaphthalene-7-sulfonic acid,
2-cyclohexylamino-5-hydroxynaphthalene-7-sulfonic acid,
2-phenylamino-5-hydroxynaphthalene-7-sulfonic acid,
2 - (4' - sulfo - phenylamino) - 5 - hydroxynaphthalene-7-sulfonic acid,
2 - (3' - carboxy - phenylamino) - 5 - hydroxynaphthalene-7-sulfonic acid,
2 - (4' - carboxy - phenylamino) - 5 - hydroxynaphthalene-7-sulfonic acid, 2-acetylamino-5-hydroxynaphthalene-7-sulfonic acid,
2-benzoylamino-5-hydroxynaphthalene-7-sulfonic acid,
2-amino-5-hydroxynaphthalene-1,7-disulfonic acid, etc.

The coupling, according to the first-described method, of the tetrazotized 4,4'-diamino-1,1'-diphenyl-3-sulfonic acid with the aromatic amide of acetoacetic acid is advantageously carried out either in a medium rendered alkaline with sodium carbonate or sodium bicarbonate or in a medium rendered acid with acetic acid or formic acid. The coupling of the diazo-monoazo compound with the amine or sulfonated amine which couples in para-position to the amino group is preferably carried out in a medium rendered acid with acetic acid or formic acid, but may also be carried out in a medium rendered alkaline with sodium carbonate or sodium bicarbonate. The final coupling of the diazodisazo dyestuff with the hydroxynaphthalene sulfonic acid of formula II is advantageously carried out in weak alkaline medium, for example in a medium rendered alkaline with sodium bicarbonate or with ammonia, in the presence of an organic base such, for example, as pyridine or quinoline.

The process is essentially analogously carried out when preparing the dyestuffs of the invention in accordance with the other two aforedescribed alternative modes of procedure.

Monoacylated 4,4'-diamino-1,1' - diphenyl - 3 - sulfonic acids which may be used in preparing the dyestuffs of the present invention comprise, among others, the following:

4-amino-4'-acetylamino-1,1'-diphenyl-3-sulfonic acid,
4-amino-4'-formylamino-1,1'-diphenyl-3-sulfonic acid,
4-amino-4'-oxalylamino-1,1'-diphenyl-3-sulfonic acid,
4-amino-4'-carbethoxy-1,1'-diphenyl-3-sulfonic acid, etc.

The saponification of the 4'-acylamino group, when this is involved in the preparation of the new dyestuffs, is advantageously carried out in alkaline medium.

The conversion of the obtained trisazo dyestuffs into the copper complex compounds thereof may be carried out in various ways, for example by heating in weakly alkaline aqueous medium with ammoniacal copper oxide solution in the presence or absence of an organic base, or by fusion with an alkali metal salt of a low molecular aliphatic monocarboxylic acid and a copper salt.

The new dyestuffs dye cellulosic fibers—for example fibers of cotton or regenerated cellulose—in bright green to olive shades of excellent fastness to washing and of very good fastness to light. They are also characterized by very good exhausting power.

The following examples are illustrative, but not restrictive, of the invention, setting forth presently preferred embodiments thereof. In the said examples, the parts are parts by weight, the percentages are percentages by weight, and the temperatures are in degrees centigrade.

*Example 1*

26.4 parts of 4,4'-diamino-1,1'-diphenyl-3-sulfonic acid are tetrazotized with the aid of 13.8 parts of sodium nitrite. After the addition of 30 parts of crystalline sodium acetate, a solution of 17.7 parts of acetoacetyl-aminobenzene and 6 parts of sodium hydroxide in 1200 parts of water is run in. Upon termination of the formation of the intermediate, the solution is made alkaline with sodium carbonate. Then a solution of 27.5 parts of the sodium salt of 1-amino-2-methoxynaphthalene-6-sulfonic acid in 300 parts of water is added. The obtained disazo dyestuff is isolated, stirred into 1500 parts of water and, after addition of 6.9 parts of sodium nitrite, is diazotized by pouring into a mixture of 40 parts of concentrated hydrochloric acid in 160 parts of water and ice at 5–10°. The thus-obtained diazo-disazo dyestuff is filtered off and introduced into a solution of 31.5 parts of 2-phenylamino-5-hydroxynaphthalene-7-sulfonic acid and 15 parts of sodium bicarbonate in 200 parts of water and 200 parts of pyridine. The resultant trisazo dyestuff is isolated and then coppered in the manner described in the following paragraph.

The isolated trisazo dyestuff is dissolved in 2000 parts of water at 85–90°. After the addition of 10 parts of sodium carbonate, a complex copper solution, prepared by admixing a solution of 25 parts of crystalline copper sulfate in 250 parts of water with 45 parts of a 25% aqueous ammonia solution, is added in the course of a half hour. The mixture is boiled under reflux for 12 hours, and the formed dyestuff which corresponds to the formula

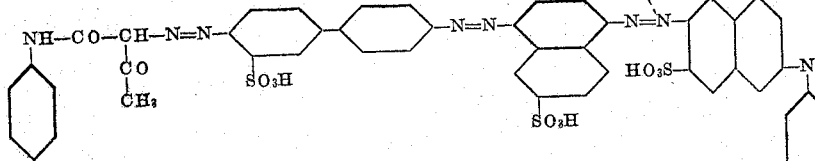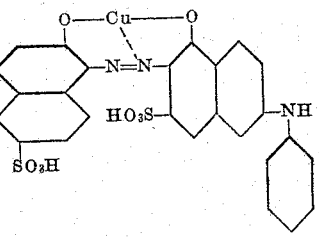

(III)

is salted out with sodium chloride and then filtered off. It is a dark powder which dissolves in water with green coloration and in concentrated sulfuric acid with brown-olive coloration. It dyes cellulosic fibers in bright green shades of outstanding fastness to washing and of very good fastness to light.

By replacing the 17.7 parts of acetoacetylaminobenzene by 19.1 parts of 1-acetoacetylamino-2-methylbenzene or by 19.1 parts of 1-acetoacetylamino-3-methylbenzene or by 19.1 parts of 1-acetoacetylamino-4-methylbenzene or by 20.7 parts of 1-acetoacetylamino-2-methoxybenzene or by 20.7 parts of 1-acetoacetylamino-3-methoxybenzene or by 20.7 parts of 1-acetoacetyl-amino-4-methoxybenzene, and otherwise proceeding as precedingly described in the present example, dyestuffs with similar properties are obtained.

Likewise, similar dyestuffs are obtained when, while otherwise proceeding as described in the first two paragraphs of this example, the 31.5 parts of 2-phenyl-amino-5-hydroxynaphthalene-7-sulfonic acid are replaced by an equivalent amount of 2-methylamino-5-hydroxynaphthalene-7-sulfonic acid of 2-ethylamino-5-hydroxynaphthalene-7-sulphonic acid or of 2-propylamino-5-hydroxynaphthalene-7-sulfonic acid or of 2-(4'-carboxy)-phenylamino-5-hydroxy-naphthalene-7-sulfonic acid or of 2-(3'-methyl) - phenylamino - 5 - hydroxynaphthalene-7-sulfonic acid or of 2-(4'-methyl)-phenylamino-5-hydroxynaphthalene-7-sulfonic acid or of 2-(3'-methoxy)-phenylamino-5-hydroxy-naphthalene-7-sulfonic acid or of 2-(4'-methoxy)-phenylamino-5 - hydroxynaphthalene-7-sulfonic acid or of 2-cyclohexylamino-5-hydroxynaphthalene-7-sulfonic acid or of 2-propionyl-amino-5-hydroxynaphthalene-7-sulfonic acid or of 2-decanoyl-amino-5-hydroxy-naphthalene-7-sulfonic acid or of 2-(4'-hydroxy-3'-carboxy)-phenylamino - 5 - hydroxynaphthalene-7-sulfonic acid or of 2-(3'-hydroxy-4-carboxy)-phenylamino-5-hydroxynaphthalene-7-sulfonic acid.

*Example 2*

30 parts of crystalline sodium acetate are added to the tetrazo compound from 26.4 parts of 4,4'-diamino-1,1'-diphenyl-3-sulfonic acid, after which a solution of 17.7 parts of acetoacetylaminobenzene and 6 parts of sodium hydroxide in 1200 parts of water in run in. Upon completion of the formation of the resultant intermediate, the solution is rendered alkaline with sodium carbonate. A solution of 27.5 parts of the sodium salt of 1-amino-2-methoxynaphthalene-6-sulfonic acid in 300 parts of water is then added. The thus-obtained dyestuff is isolated, stirred into 1500 parts of water and, after the addition of 6.9 parts of sodium nitrite, is diazotized by pouring into an ice-cold aqueous solution containing 40 parts of concentrated hydrochloric acid at 5–10°. The resultant diazo-disazo dyestuff is filtered off and introduced into a solution of 31.9 parts of 2-amino-5-hydroxynaphthalene-1,7-disulfonic acid and 30 parts of sodium bicarbonate in 200 parts of water and 200 parts of pyridine. The resultant trisazo dyestuff is isolated and then coppered in the manner described in the following paragraph.

The trisazo dyestuff of the preceding paragraph, in the form of a moist, but well-pressed filter cake is warmed with 350 parts of crystalline sodium acetate and 50 parts of crystalline copper sulfate until a homogeneous melt results, and is then heated—while water distills off—until a temperature of 107–108° is reached. The whole is then boiled under reflux for 15 hours while stirring thoroughly. Sufficient water is then added dropwise to dissolve all mineral salts present, without however dissolving any of the dyestuff. The dyestuff, which corresponds to the formula in 250 parts of water with 45 parts of a 25% aqueous ammonia solution, is added in the course of a half hour. The mixture is boiled under reflux for 12 hours, and then the dyestuff, which corresponds to the formula

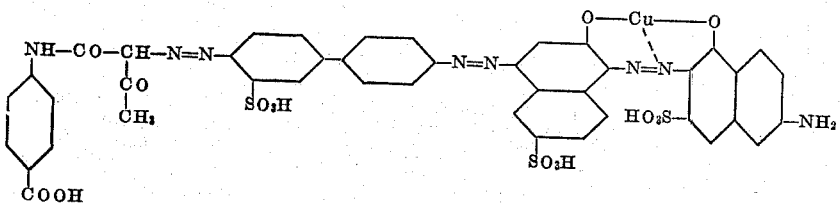

is salted out with sodium chloride and filtered off. It is a dark powder which dissolves with green coloration in water and with blue-green coloration in concentrated sulfuric acid. It dyes celulosic fibers in bright olive shades of outstanding fasteness to washing and of very good fastness to light.

If, while otherwise proceeding according to the pre-

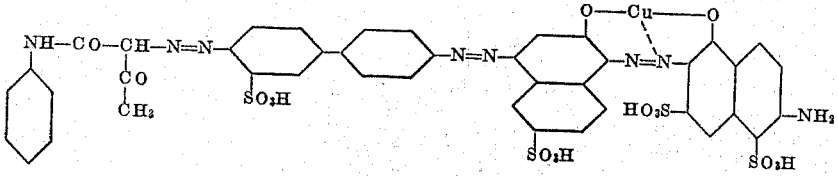

is then filtered off and dried. It dissolves in water with a green coloration, and with olive coloration in concentrated sulfuric acid, and dyes cotton and fibers of regenerated cellulose in green shades of very good fastness to light and to washing.

If, while otherwise proceeding as described in the foregoing two paragraphs, the 31.9 parts of 2-amino-5-hydroxynaphthalene-1,7-disulfonic acid are replaced by 39.5 parts of 2-(4'-sulfophenylamino)-5-hydroxynaphthalene-7-sulfonic acid or by 35.9 parts of 2-(3'-carboxyphenylamino)-5-hydroxynaphthalene-7-sulfonic acid or by 30.4 parts of 1-hydroxynaphthalene-3,6-disulfonic acid or by 30.4 parts of 1-hydroxynaphthalene-3,8-disulfonic acid or by 30.4 parts of 2-hydroxynaphthalene-3,6-disulfonic acid, dyestuffs of similar properties are obtained.

ceding two paragraphs, the 24.3 parts of the sodium salt of 1-acetoacetylaminobenzene-4-carboxylic acid are replaced by 25.9 parts of the sodium salt of 1-acetoacetylamino-4-hydroxybenzene-3-carboxylic acid or by 25.9 parts of the sodium salt of 1-acetoacetylamino-3-hydroxybenzene-4-carboxylic acid and/or the 23.9 parts of 2-amino-5-hydroxynaphthalene-7-sulfonic acid are replaced by 34.3 parts of 2-benzoylamino-5-hydroxynaphthalene-7-sulfonic acid or by 28.1 parts of 2-acetylamino-5-hydroxynaphthalene-7-sulfonic acid, dyestuffs which yield dyeings of similar shades and which have similar fastness properties are obtained.

*Example 3*

26.4 parts of 4,4'-diamino-1,1'-diphenyl-3-sulfonic acid are tetrazotized with the aid of 13.8 parts of sodium nitrite. After the addition of 30 parts of crystalline sodium acetate, a solution of 24.3 parts of the sodium salt of 1-acetoacetylaminobenzene-4-carboxylic acid and 6 parts of sodium hydroxide in 1200 parts of water, is run in. Upon completion of the formation of the resultant intermediate, the solution is adjusted to alkalinity by means of sodium carbonate. Then a solution of 27.5 parts of the sodium salt of 1-amino-2-methoxynaphthalene-6-sulfonic acid in 300 parts of water is added. The obtained disazo dyestuff is isolated, stirred into 1500 parts of water and, after addition of 6.9 parts of sodium nitrite, is diazotized by pouring into a mixture of 40 parts of concentrated hydrochloric acid in 200 parts of water and ice at 5–10°. The thus-produced diazo-disazo dyestuff is filtered off and introduced into a solution of 23.9 parts of 2-amino-5-hydroxynaphthalene-7-sulfonic acid and 15 parts of sodium bicarbonate in 200 parts of water and 200 parts of pyridine. The resultant trisazo dyestuff is isolated and then coppered in the manner described in the following paragraph.

The trisazo dyestuff, obtained according to the preceding paragraph, is dissolved in 2000 parts of water at 85–90°. After the addition of 10 parts of sodium carbonate, a complex copper solution, prepared by admixing a solution of 25 parts of crystalline copper sulfate

*Example 4*

26.4 parts of 4,4'-diamino-1,1'-diphenyl-3-sulfonic acid are tetrazotized with the aid of 13.8 parts of sodium nitrite. The tetrazo solution is adjusted to weak alkalinity with sodium bicarbonate, and then a solution of 17.7 parts of acetoacetylaminobenzene in 2000 parts of water is slowly run in. When the formation of intermediate product is over, the solution is adjusted to alkalinity with sodium carbonate. Then a solution of 28.9 parts of the sodium salt of 2-ethoxy-1-aminonaphthalene-6-sulfonic acid in 300 parts of water is added. The obtained disazo dyestuff is isolated, stirred into 1500 parts of water and, after the addition of 6.9 parts of sodium nitrite, diazotized at 5–10° by pouring into an ice-cold aqueous solution containing 40 parts of concentrated hydrochloric acid. The thus-obtained diazo-disazo dyestuff is filtered off and introduced into a solution of 22.4 parts of 1-hydroxy-naphthalene-4-sulfonic acid and 15 parts of sodium bicarbonate in 200 parts of water and 200 parts of pyridine. The resultant trisazo dyestuff is isolated and then coppered in the manner described in the following paragraph.

The said trisazo dyestuff, as obtained according to the preceding paragraph, is dissolved in 2000 parts of water at 85–90°. Then, after the addition of 10 parts of sodium carbonate, a complex copper solution, prepared by admixing a solution of 25 parts of crystalline copper sulfate in 250 parts of water with 45 parts of a 25% aqueous ammonia solution, is added in the course of a half hour. The whole is then boiled under reflux for 12 hours, the product salted out with sodium chloride, and the precipitated dyestuff which corresponds to the formula

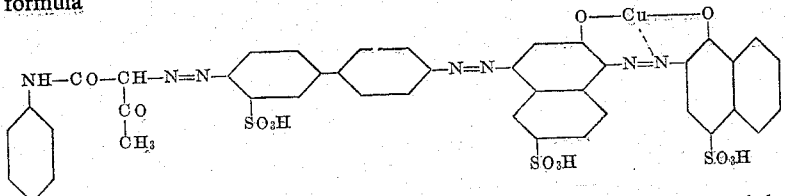

filtered off. It is a dark powder which dissolves with green coloration in water and with brown-olive coloration in concentrated sulfuric acid. It dyes cotton and fibers of regenerated cellulose in bright yellowish green shades of very good fastness to light and to washing.

If, while otherwise proceeding as previously described in the present example, the 17.7 parts of acetoacetylaminobenzene are replaced by 25.7 parts of 1-acetoacetylaminobenzene-3-sulfonic acid or by 25.7 parts of 1-acetylaminobenzene-4-sulfonic acid or by 28.7 parts of 1-acetoacetylamino-2-methoxybenzene-4-sulfonic acid and/or the 22.4 parts of 1-hydroxynaphthalene-4-sulfonic acid are replaced by 22.4 parts of 2-hydroxynaphthalene-4-sulfonic acid or by 22.4 parts of 2-hydroxynaphthalene-6-sulfonic acid, dyestuffs of similar properties are obtained.

Example 5

30 parts of crystalline sodium acetate are added to the tetrazo compound from 26.4 parts of 4,4'-diamino-1,1'-diphenyl-3-sulfonic acid, and then a solution of 43.0 parts of the sodium salt of 2-acetoacetylaminonaphthalene-5,7-disulfonic acid in 1200 parts of water is run in. Upon completion of the resultant intermediate formation, the solution is made acid with acetic acid, and a solution of 13.7 parts of 1-amino-5-methyl-2-methoxybenzene and 12 parts of concentrated hydrochloric acid in 200 parts of water is added dropwise. When the thus-initiated coupling is finished, the reaction mass is adjusted to alkalinity with sodium carbonate, the formed disazo dyestuff isolated, stirred into 1500 parts of water and, after addition of 6.9 parts of sodium nitrite, diazotized by pouring into a mixture of 40 parts of concentrated hydrochloric acid in 240 parts of water and ice at 5–10°. The thus-obtained diazo-disazo dyestuff is filtered off and then introduced into a solution of 22.4 parts of 1-hydroxynaphthalene-4-sulfonic acid and 15 parts of sodium bicarbonate in 200 parts of water and 200 parts of pyridine. The resultant trisazo dyestuff is isolated and then coppered in the manner described in the following paragraph.

The aforesaid trisazo dyestuff is dissolved in 2000 parts of water at 80–90°. After the addition of 10 parts of sodium carbonate, a complex copper solution, prepared by admixing a solution of 25 parts of crystalline copper sulfate in 250 parts of water with 45 parts of a 25% aqueous ammonia solution, is added in the course of a half hour. The mixture is boiled under reflux for 12 hours, and the formed dyestuff which corresponds to the formula 2-methoxybenzene are replaced by 15.3 parts of 1-amino-2,5-dimethoxybenzene or by 17.3 parts of 1-amino-2-methoxynaphthalene or by 18.7 parts of 1-amino-2-ethoxynaphthalene or by 12.3 parts of 1-amino-2-methoxybenzene or by 18.0 parts of 1-amino-2-methoxy-5-acetylaminobenzene, dyestuffs of similar shades and of like properties are obtained.

Example 6

28.6 parts of the sodium salt of 4,4'-diamino-1,1'-diphenyl-3-sulfonic acid are dissolved in 800 parts of water. After the addition of 6.9 parts of sodium nitrite, 40 parts of glacial acetic acid are run in at 10° and the mixture stirred until diazotization is complete. The diazo solution is poured into a solution of 17.7 parts of acetoacetylaminobenzene and 6 parts of sodium hydroxide in 600 parts of water. Upon completion of the coupling which takes place, the resultant dyestuff is isolated, then stirred into 1200 parts of water and, after the addition of 6.9 parts of sodium nitrite, diazotized at 5–10° by pouring into a mixture of 40 parts of concentrated hydrochloric acid in 200 parts of a mixture of water and ice. The thus-obtained diazo-monoazo compound is run, at 10°, into a solution of 27.5 parts of the sodium salt of 1-amino-2-methoxynaphthalene-6-sulfonic acid and 20 parts of sodium carbonate in 300 parts of water. Upon completion of the coupling, the dyestuff is isolated and further worked up as described in Example 2.

The thus-prepared dyestuff has properties similar to those described in Example 2. It corresponds to the formula

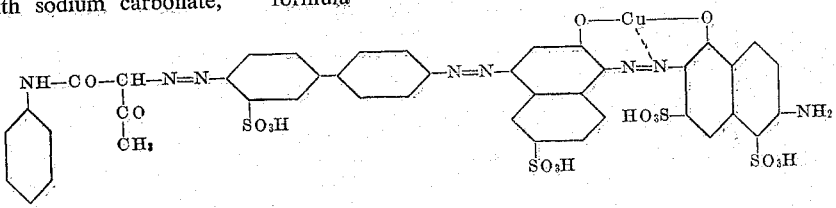

Example 7

30 parts of crystalline sodium acetate are added to the tetrazo compound from 26.4 parts of 4,4'-diamino-1,1'-diphenyl-3-sulfonic acid, and then a solution of 43.0 parts of the sodium salt of 2-acetoacetylamino-naphthalene-5,7-disulfonic acid in 1200 parts of water is run in. Upon completion of the resultant intermediate formation, the solution is rendered alkaline with sodium carbonate. A solution of 27.5 parts of the sodium salt of 1-amino-2-methoxy-naphthalene-6-sulfonic acid in 300 parts of water is then added. The resultant disazo dyestuff is isolated, stirred into 1500 parts of water and, after the addition of 6.9 parts of sodium nitrite, is diazotized at 5–10° by pouring into a mixture of 40 parts of concentrated hydrochloric acid in 200 parts of a mixture of water and ice. The now-present diazo-disazo dyestuff is filtered off and introduced into a solution of 16.6 parts of the sodium salt of 2-hydroxynaphthalene and 15 parts of sodium bicarbonate in 200 parts of water and 200 parts of pyridine, whereupon coupling takes place. The resultant trisazo dyestuff is isolated and then coppered in the manner described in the following paragraph.

The triazo dyestuff, obtained as described in the preceding paragraph, is dissolved in 2000 parts of water at 80–90°. After the addition of 10 parts of sodium car-

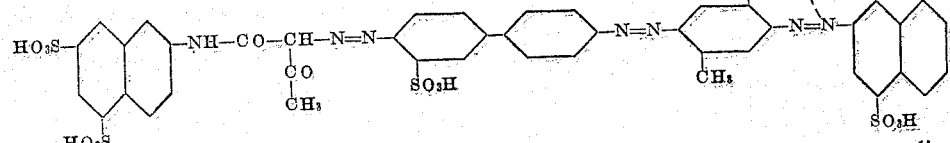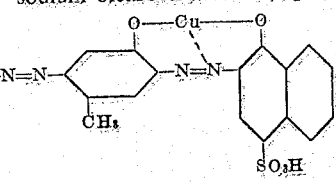

is salted out with sodium chloride and filtered off. The dyestuff is a dark powder which dissolves with green coloration in water. It dyes cellulosic fibers in green shades of very good fastness properties.

If, while otherwise proceeding as aforedescribed in the present example, the 13.7 parts of 1-amino-5-methylbonate, a copper complex solution, prepared by admixing a solution of 25 parts of crystalline copper sulfate in 250 parts of water with 45 parts of a 25% aqueous ammonia solution, is run within the course of a half hour. The resultant mixture is then boiled under reflux for 12 hours, and the thus-formed dyestuff which corresponds to the formula

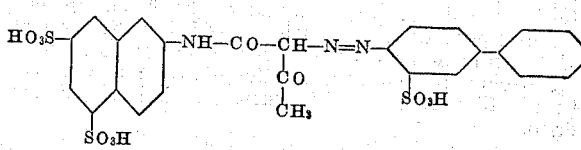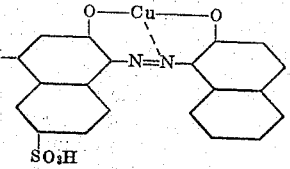

is salted out with sodium chloride and is isolated. The dyestuff is a dark powder which dissolves with green coloration in water and which dyes cellulosic fibers in olive-green shades of very good fastness to washing and to light.

*Example 8*

26.4 parts of 4,4'-diamino-1,1'-diphenyl-3-sulfonic acid are tetrazotized with the aid of 13.8 parts of sodium nitrite. After the addition of 30 parts of crystalline sodium acetate, a solution of 43.0 parts of the sodium salt of 2-acetoacetylaminonaphthalene-5,7-disulfonic acid in 1200 parts of water is run in. Upon completion of the resultant intermediate formation, a solution of 28.9 parts of the sodium salt of 1-amino-2-ethoxynaphthalene-6-sulfonic acid in 300 parts of water is added to the reaction mass. The pH of the solution is maintained between 4 and 4.5 by the addition of sodium acetate. The thus-produced disazo dyestuff is filtered off, stirred into 1500 parts of water and 40 parts of concentrated sodium hydroxide solution and, after the addition of 6.9 parts of sodium nitrite, is diazotized at 5–10° by pouring into a mixture of 75 parts of concentrated hydrochloric acid and 200 parts of a mixture of water and ice. The isolated diazo-disazo dyestuff is introduced into a solution of 34.3 parts of 2-benzoylamino-5-hydroxynaphthalene-7-sulfonic acid in 20 parts of concentrated aqueous ammonia solution, 200 parts of water and 200 parts of pyridine, whereupon formation of trisazo dyestuff takes place. The latter is isolated and converted into the copper complex compound thereof. This is carried out after the manner described in the second paragraph of Example 1 or of Example 2. The cupriferous trisazo dyestuff which corresponds to the formula

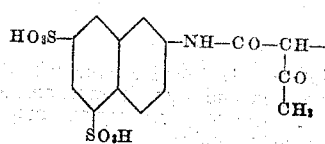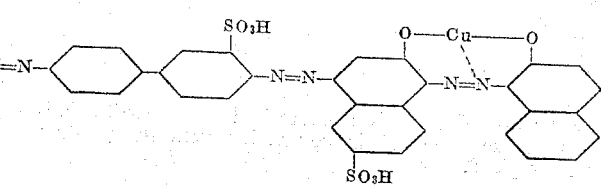

is a dark powder which dissolves with green coloration in water and with olive coloration in concentrated sulfuric acid, and dyes cotton and fibers of regenerated cellulose in dark-olive shades of outstanding fastness to washing and to light.

If, while otherwise proceeding according to the present example, the 34.3 parts of 2-benzoylamino-5-hydroxynaphthalene-7-sulfonic acid are replaced by an equivalent quantity of 2-(4'- or 3'- or 2'-nitro)-benzoylamino- or 2-(4'- or 3'- or 2'-chloro or -bromo)-benzoylamino- or 2-(4'- or 3'- or 2'-amino)-benzoylamino- or 2-(4'- or 3'- or 2'-methyl)-benzoylamino- or 2-(4'- or 3'- or 2'-ethoxy)-benzoylamino-5-hydroxynaphthalene-7-sulfonic acid, dyestuffs of similar properties are obtained.

*Example 9*

The diazo compound from 30.6 parts of 4-amino-4'-acetylamino-1,1'-diphenyl-3-sulfonic acid is added to a solution of 27.5 parts of the sodium salt of 1-amino-2-methoxy-naphthalene-6-sulfonic acid in 300 parts of water. The pH of the solution is maintained between 4 and 4.5 by the addition of sodium acetate or sodium formate until the coupling is completed. The formed monoazo dyestuff is isolated, dissolved in 600 parts of water containing 40 parts of concentrated sodium hydroxide solution and, after the addition of 7.0 parts of sodium nitrite, diazotized at 5–10° by pouring into a mixture of 75 parts of concentrated hydrochloric acid and 200 parts of a mixture of water and ice. The resultant diazo-azo suspension is then added to a solution of 14.4 parts of 2-hydroxynaphthalene in 400 parts of water and 30 parts of concentrated sodium hydroxide solution. 20 parts of sodium carbonate are then added and the mixture stirred at 5° until the further coupling which ensues is completed. The formed disazo dyestuff is isolated, and then, in order to saponify the 4'-acetylamino group, stirred into 1000 parts of water and, after the addition of 100 parts of concentrated sodium hydroxide solution, stirred at 80–90° until complete saponification has been achieved. 7 parts of sodium nitrite are then added, and diazotization effected at 5–10° by pouring the reaction mass into a mixture of 150 parts of concentrated hydrochloric acid and 200 parts of ice. The resultant diazo-disazo dyestuff is isolated and is added to a solution of 43.0 parts of the sodium salt of 2-acetoacetylamino-naphthalene-5,7-disulfonic acid, 500 parts of water and 200 parts of pyridine, whereupon trisazo dyestuff formation takes place. The trisazo dyestuff is isolated and converted into the copper complex after the manner described in the second paragraph of Example 1 or 2. The cupriferous dyestuff which corresponds to the formula

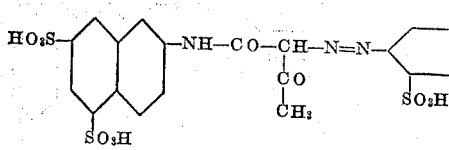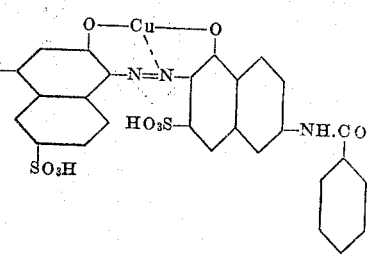

is a dark powder which possesses properties similar to those of the product described in Example 7.

*Example 10*

The diazo compound from 33.6 parts of 4-amino-4'-carbethoxy-1,1'-diphenyl-3-sulfonic acid is added to a solution of 43.0 parts of the sodium salt of 2-acetoacetylaminonaphthalene-5,7-disulfonic acid, 30 parts of concentrated sodium hydroxide solution, 10 parts of sodium carbonate and 400 parts of water. Upon completion of the coupling which ensues, 80 parts of concentrated sodium hydroxide solution are added and the whole is heated to 90-95° until the 4'-carbethoxyamino group is completely converted, by saponification, into the amino group. The aminoazo dyestuff is isolated, then dissolved in 400 parts of water and, after the addition of 7.0 parts of sodium nitrite, diazotized by pouring into a mixture of 25 parts of concentrated hydrochloric acid and 100 parts of ice, at 5-10°. Upon completion of the diazotization, 50 parts of sodium acetate are added to the diazo solution, followed by a solution of 27.5 parts of the sodium salt of 1-amino-2-methoxynaphthalene-6-sulfonic acid in 300 parts of water. The mixture is stirred at 5-10° until the coupling which ensues is completed, the mixture then made alkaline by the addition of 40 parts of concentrated sodium hydroxide solution, 7.0 parts of sodium nitrite added, and further diazotization carried out by pouring the reaction mixture into a mixture of 75 parts of concentrated hydrochloric acid and 200 parts of ice. When this diazotization has run to completion, the diazo-disazo dyestuff is filtered off and introduced at 5-10° into a solution of 34.3 parts of 2-benzoylamino-5-hydroxynaphthalene-7-sulfonic acid in 20 parts of concentrated aqueous ammonia solution, 200 parts of water and 200 parts of pyridine base mixture, whereupon trisazo dyestuff formation takes place. The dyestuff is isolated and converted into the copper complex compound by the method disclosed in paragraph 2 of Example 1 or Example 2. The cupriferous dyestuff which corresponds to the formula

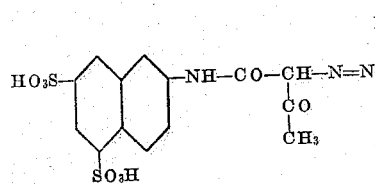

is a dark powder and is characterized by properties similar to those described in connection with the product of Example 8.

*Example 11*

5 parts of cotton are inserted in a dyebath containing 100 parts of lime-free water at 50°. Then a concentrated aqueous solution, containing 0.1 part of a dyestuff corresponding to formula III supra (and which may be replaced by 0.1 part of any of the cupriferous dyestuff products of the other examples), is added to the bath which is thereupon heated to boiling in the course of a half hour, the boiling temperature being then maintained for a further half hour. In the course of the dyeing process, 0.5 to 2 parts of Glauber salt are added in the form of a concentrated aqueous solution. Upon completion of the dyeing, the material is allowed to remain in the bath until it cools to 50°, whereupon it is rinsed and dried.

Having thus disclosed the invention what is claimed is:

1. A copper complex compound of a trisazo dyestuff which corresponds in its copper-free form to the general formula

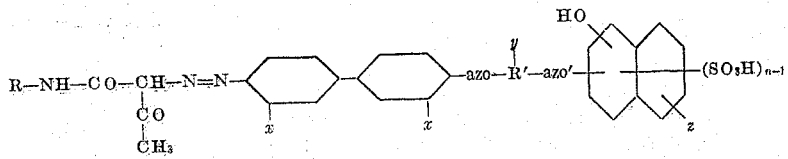

wherein R stands for a radical selected from the group consisting of radicals of the benzene and naphthalene series, R' stands for a radical selected from the group consisting of radicals of the benzene and naphthalene series, one $x$ stands for —$SO_3H$ and the other $x$ for hydrogen, $y$ is in ortho-position to -azo'- and stands for a member selected from the group consisting of —$OCH_3$ and —$OC_2H_5$, $z$ stands for a member selected from the group consisting of hydrogen, —$NH_2$, —NH.lower alkyl, —NH.cycloalkyl, —NH.mono-nuclear aryl, —NH.CO.alkyl and —NH.CO.mono-nuclear aryl, and $n$ is one of the integers 1, 2 and 3, and wherein OH stands in ortho-position and -azo- in para-position to -azo'-.

2. The copper complex compound which corresponds to the formula

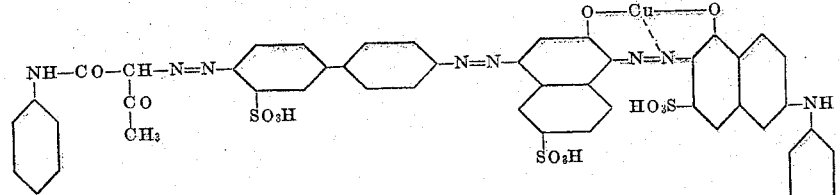

3. The copper complex compound which corresponds to the formula

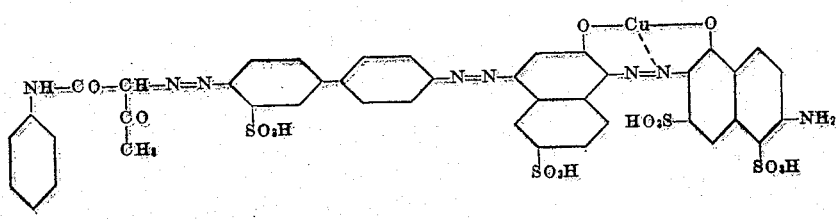

4. The copper complex compound which corresponds to the formula
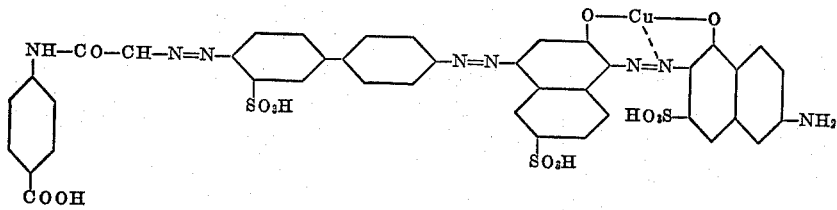
5. The copper complex compound which corresponds to the formula
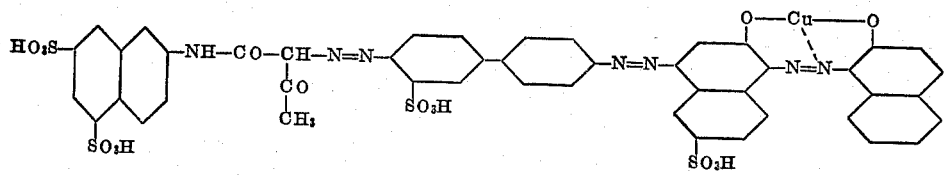
6. The copper complex compound which corresponds to the formula
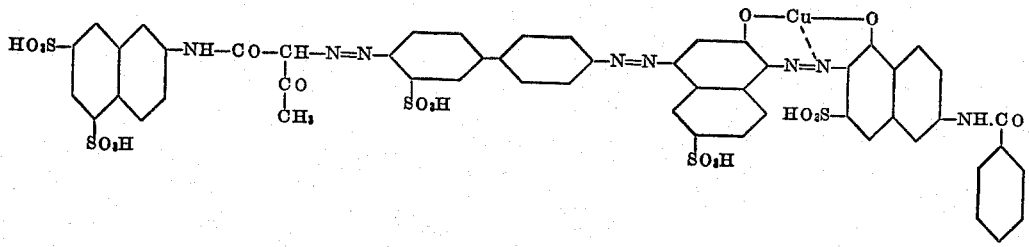
References Cited in the file of this patent
UNITED STATES PATENTS
| | | |
|---|---|---|
| 1,851,121 | Stusser | Mar. 29, 1932 |
| 2,282,331 | Krebser et al. | May 12, 1942 |